J. T. WILSON.
Car-Coupling.

No. 163,429.

Patented May 18, 1875.

Witnesses.
D. R. Cowl
Edmund Masson

Inventor.
John T. Wilson,
By Atty A. B. Stoughton.

UNITED STATES PATENT OFFICE.

JOHN T. WILSON, OF PITTSBURG, PENNSYLVANIA.

IMPROVEMENT IN CAR-COUPLINGS.

Specification forming part of Letters Patent No. 163,429, dated May 18, 1875; application filed May 5, 1875.

*To all whom it may concern:*

Be it known that I, JOHN T. WILSON, of Pittsburg, in the county of Allegheny and State of Pennsylvania, have invented certain new and useful Improvements in Making Draw-Bars for Railroad-Cars; and I do hereby declare the following to be a full, clear, and exact description of the same, reference being had to the accompanying drawings making a part of this specification, in which—

Figure 1:
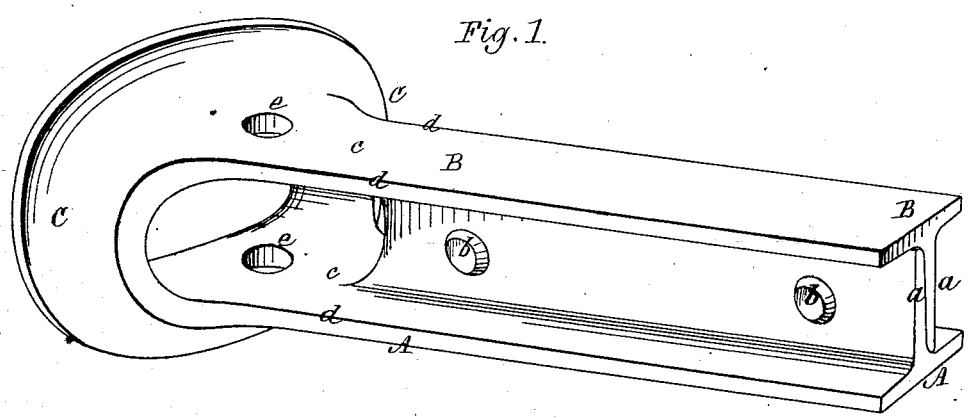
Figure 2:
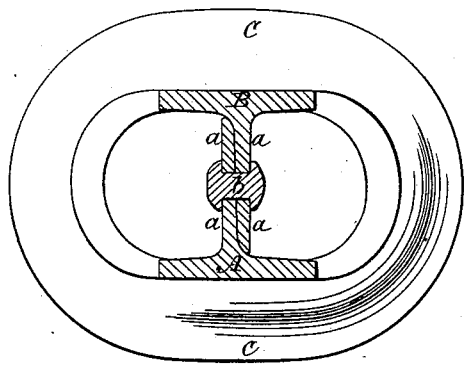

Figure 1 represents, in perspective, one of the draw-bars in question; and Fig. 2 represents a cross-section through the same.

Draw-bars, as commonly made, have the strengthening-piece, which lies between the top and bottom bars, made separate, and vertical bolts pass through to hold the three parts together. These bolt-holes through the top and bottom bars so weaken them as to make them liable to break at these points, and the object of my invention is to avoid such casualty.

The nature of my invention consists in making the strengthening-piece solid with the top and bottom bars, and lapped laterally, so that horizontal bolts may be used, and thus avoid weakening the top and bottom bars, or in making the web or strengthening-piece solid, and so avoid the use of bolts entirely.

To enable others skilled in the art to make and use my invention, I will proceed to describe the same with reference to the drawings.

As shown in the drawing, two pieces of angle or T-shaped iron, A B, are used with their stems or webs $a\ a$ laid together and riveted through horizontally by bolts $b\ b$. The buffer-head C is made by taking an oval or circular shaped plate and cutting H-shaped gashes through it, and then with a die driving the central portion of the metal through and shaping the perimeter thereof. The driven-through portions form the projecting portions seen at $c\ c$, and these portions are welded to the bases, respectively, of the two bars A B at about the points $d$. By thus making the draw-bar of three pieces the holes E are more easily punched in, as it can be done before the riveting $b\ b$ is done, or the two parts A B are brought together; but I can take a single piece of I-shaped or beam iron and weld the projections $c\ c$ thereto, thus using but two pieces of metal, and dispensing with the through-bolts $b\ b$ entirely. This involves trouble in making the holes $e\ e$, especially when a slot is cut in rear of the holes, which is often required in draw-bars. Still it can be done; but I prefer the plan shown in the drawings as more simple and economical, and mention the other as an obvious modification of it.

Having thus described my invention, what I claim is—

The draw-bar having the strengthening portion $a\ a$ thereof made solid with the top and bottom bars A B, substantially as and for the purpose set forth.

JOHN T. WILSON.

Witnesses:
 A. B. STOUGHTON,
 EDMUND MASSON.